United States Patent
Krishnamurthy et al.

(10) Patent No.: US 11,159,370 B2
(45) Date of Patent: Oct. 26, 2021

(54) BULK DISCOVERY OF DEVICES BEHIND A NETWORK ADDRESS TRANSLATION DEVICE

(71) Applicant: Juniper Networks, Inc., Sunnyvale, CA (US)

(72) Inventors: Pradeep H. Krishnamurthy, Bangalore (IN); Chandrasekhar A, Bangalore (IN); Rahamath Sharif, Bangalore (IN); Raviraj Satish Deshmukh, Pune (IN)

(73) Assignee: Juniper Networks, Inc., Sunnyvale, CA (US)

( * ) Notice: Subject to any disclaimer, the term of this patent is extended or adjusted under 35 U.S.C. 154(b) by 89 days.

(21) Appl. No.: 16/669,830

(22) Filed: Oct. 31, 2019

(65) Prior Publication Data

US 2021/0135934 A1 May 6, 2021

(51) Int. Cl.
*H04L 12/28* (2006.01)
*H04L 12/24* (2006.01)
(Continued)

(52) U.S. Cl.
CPC ...... *H04L 41/0806* (2013.01); *H04L 12/4633* (2013.01); *H04L 41/12* (2013.01);
(Continued)

(58) Field of Classification Search
CPC ... H04L 12/287; H04L 12/46; H04L 12/4633; H04L 61/2514; H04L 63/02; H04L 63/029; H04L 63/0492; H04L 63/0853
(Continued)

(56) References Cited

U.S. PATENT DOCUMENTS 7,274,684 B2 * 9/2007 Young ............... H04L 12/4633
370/352
7,706,371 B1 4/2010 Wing et al.
(Continued)

FOREIGN PATENT DOCUMENTS

WO 2010141603 A2 12/2010

OTHER PUBLICATIONS

U.S. Appl. No. 16/669,869 entitled "Bulk Discovery of Devices Behind a Network Address Translation Device" (inventor: Krishnamurthy) filed Oct. 31, 2019, Juniper Networks, Inc.
(Continued)

*Primary Examiner* — Dmitry Levitan
(74) *Attorney, Agent, or Firm* — Shumaker & Sieffert, P.A.

(57) ABSTRACT

In one example, a network management system discovers a plurality of network devices behind a network address translation device, such as a firewall. The network management system may receive a model of a seed network device, generate a first activation configuration and commit the first activation configuration on the seed network device. The network management system may connect to the seed network device and discover neighboring devices from information in the seed network device. The network management system may connect to the neighboring devices, automatically create a model of the neighboring network devices, generate s activation configurations for the neighboring network devices and commit the activation configurations on the neighboring network devices. The network management system may iterative perform these steps until it discovers all the discoverable network devices behind the network address translation device.

18 Claims, 3 Drawing Sheets

(51) Int. Cl.
  *H04L 12/46* (2006.01)
  *H04L 29/12* (2006.01)
  *H04W 8/00* (2009.01)
(52) U.S. Cl.
  CPC ...... *H04L 61/2567* (2013.01); *H04L 61/6022* (2013.01); *H04W 8/005* (2013.01)
(58) Field of Classification Search
  USPC .................. 370/401, 449; 726/11, 13, 14
  See application file for complete search history.

(56) References Cited

U.S. PATENT DOCUMENTS

| | | | | |
|---|---|---|---|---|
| 7,821,967 | B2* | 10/2010 | Shimura | H04L 12/12 370/254 |
| 7,903,585 | B2* | 3/2011 | Feng | H04L 61/2571 370/255 |
| 8,701,175 | B2* | 4/2014 | Edwards | H04L 41/28 726/11 |
| 8,825,816 | B2* | 9/2014 | Deutsch | H04L 29/12367 709/221 |
| 9,680,704 | B2* | 6/2017 | Pera | H04W 24/04 |
| 9,769,139 | B2* | 9/2017 | Chizhov | G06F 21/6236 |
| 9,893,940 | B1 | 2/2018 | Chawla et al. | |
| 10,374,886 | B1* | 8/2019 | A | H04L 41/20 |
| 10,708,385 | B2* | 7/2020 | Tachi | H04L 67/2876 |
| 2002/0178239 | A1 | 11/2002 | Kinyon et al. | |
| 2007/0189190 | A1 | 8/2007 | Feng et al. | |
| 2010/0215025 | A1 | 8/2010 | Fujii | |
| 2011/0106921 | A1 | 5/2011 | Brown et al. | |
| 2012/0191875 | A1 | 7/2012 | Kano | |
| 2014/0075541 | A1* | 3/2014 | Young | H04L 12/6418 726/14 |
| 2015/0026313 | A1 | 1/2015 | Chawla et al. | |
| 2015/0088964 | A1 | 3/2015 | Shiell et al. | |
| 2016/0255514 | A1 | 9/2016 | Kim et al. | |
| 2018/0323996 | A1 | 11/2018 | Roman et al. | |
| 2019/0109921 | A1* | 4/2019 | Matsushima | H04L 41/044 |
| 2020/0065454 | A1 | 2/2020 | Lei et al. | |

OTHER PUBLICATIONS

"Junos Space—Edge Services Director User Guide" Juniper Networks, Inc., May 28, 2019, available at https://www.juniper.net/documentation/en_US/junos-space-apps/edge-services-director1.0/information-products/pathway-pages/edge-services-director-pwp.html (last accessed Nov. 6, 2020), 738 pp.

Extended European Search Report dated Aug. 6, 2020 received in EP counterpart 20153299.1, 10 pp.

Kumari et al. "Secure Device Install" draft-ietf-opsawg-sdi-00, Network Working Group, Internet-Draft, Jul. 22, 2019, 16 pp.

Harrington et al., "An Architecture for Describing Simple Network Management Protocol (SNMP) Management Frameworks," RFC 3411, Network Working Group, the Internet Engineering Task Force draft, Dec. 2002, 64 pp.

Enns, "NETCONF Configuration Protocol," Network Working Group, RFC 4741, Dec. 2006, 96 pp.

Ou et al., "Automatically Configuring the IP Addresses for Mobile Network in Collaborative Network," 2020 IEEE 5th Information Technology and Mechatronics Engineering Conference(ITOEC), Jun. 12-14, 2020, 6 pp.

* cited by examiner

BULK DISCOVERY OF DEVICES BEHIND A NETWORK ADDRESS TRANSLATION DEVICE

TECHNICAL FIELD

This disclosure relates to computer networks, and more particularly, to discovering and configuring network devices.

BACKGROUND

A computer network is a collection of interconnected computing devices that may exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, an administrator may perform configuration tasks as well as perform operational commands to collect and view operational data of the managed devices. For example, the administrator may configure interface cards of the device, adjust parameters for supported network protocols, specify physical components within the device, modify routing information maintained by a router, access software modules and other resources residing on the device, and perform other configuration tasks. In addition, the administrator may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems may support these services such that an administrator may easily create and manage these high-level network configuration services. In customer deployments, there may be thousands to millions of connectivity services. When the services are changed, the network management system typically deploys configuration services in the network via transactions. In some cases, there may be concurrent changes across the devices, as multiple administrators may modify the services in parallel.

Network management systems typically have an ability to discover devices in its network an automatically add them, for example, as a device object, for further management, such as pushing a configuration. For example, a user may specify a range of IP addresses or a subnet and specify credentials, such as through simple network management protocol (SNMP). The network management system may then sweep through the list of IP addresses and add all the reachable devices for further management.

SUMMARY

In general, this disclosure describes techniques for managing network devices. A network management system may discover network devices behind a network address translation (NAT) device, such as a firewall, and configure the discovered network devices.

In one example, a method includes connecting through a first connection, at a network management system, with a seed network device; discovering through the first connection, by the network management system, a plurality of neighboring network devices that neighbor the seed network device; initiating, by the network management system, second tunneled connections to the plurality of neighboring network devices through the seed device; committing through the second connections, by the network management system, an activation configuration on each of the plurality of neighboring network devices, each activation configuration being unique to one of the plurality of neighboring devices; establishing, by the network management system and in response to the committing of the activation configurations, a non-tunneled ssh connection to each of the plurality of neighboring network devices.

In another example, a system includes memory and one or more processors coupled to the memory, the one or more processors being configured to: connect to a seed network device through a first connection; discover through the first connection a plurality of neighboring network devices that neighbor the seed network device; initiate tunneled second connections to the plurality of neighboring network devices through the seed device; commit through the tunneled second connections an activation configuration on each of the plurality of neighboring network devices, each activation configuration being unique to one of the plurality of neighboring network devices; and in response to the committing of the activation configurations, establish a non-tunneled ssh connection to each of the plurality of neighboring network devices.

In another example, a non-transitory computer readable medium includes instructions that when executed by one or more processors cause the one or more processors to connect to a seed network device through a first connection, discover through the first connection a plurality of neighboring network devices that neighbor the seed network device, initiate tunneled second connections to the plurality of neighboring network devices through the seed device, commit through the tunneled second connections an activation configuration on each of the plurality of neighboring network devices, each activation configuration being unique to one of the plurality of neighboring network devices, and in response to the committing of the activation configurations, establish a non-tunneled ssh connection to each of the plurality of neighboring network devices.

The details of one or more examples are set forth in the accompanying drawings and the description below. Other features, objects, and advantages will be apparent from the description and drawings, and from the claims.

DETAILED DESCRIPTION

When devices that an administrator may want to add to a network management system are behind a NAT device (relative to the network management system), such as a firewall, the network management system may not be able to sweep through a range of IP addresses or a subnet because network management system may not have access to the private IP addresses of the network devices behind the firewall and thereby may not be able to add them for further management. In this example, an administrator may have to manually add each of the network devices behind the firewall to the network management system. For example, an administrator could model a network device on the network management system. The network management system could generate an activation configuration for the network device. The network management system could commit the activation configuration on the network device. The network management system could then wait for an outbound ssh connection from the network device. This process could be repeated to add each network device behind the NAT device. If the number of network devices behind the firewall is large, adding each of the network devices manually may be a time-consuming and tedious task. The techniques of this disclosure enable a network management system to add network devices behind a NAT device without requiring an administer to manually add all of the network devices behind the NAT device onto the network management system.

Figure 1:
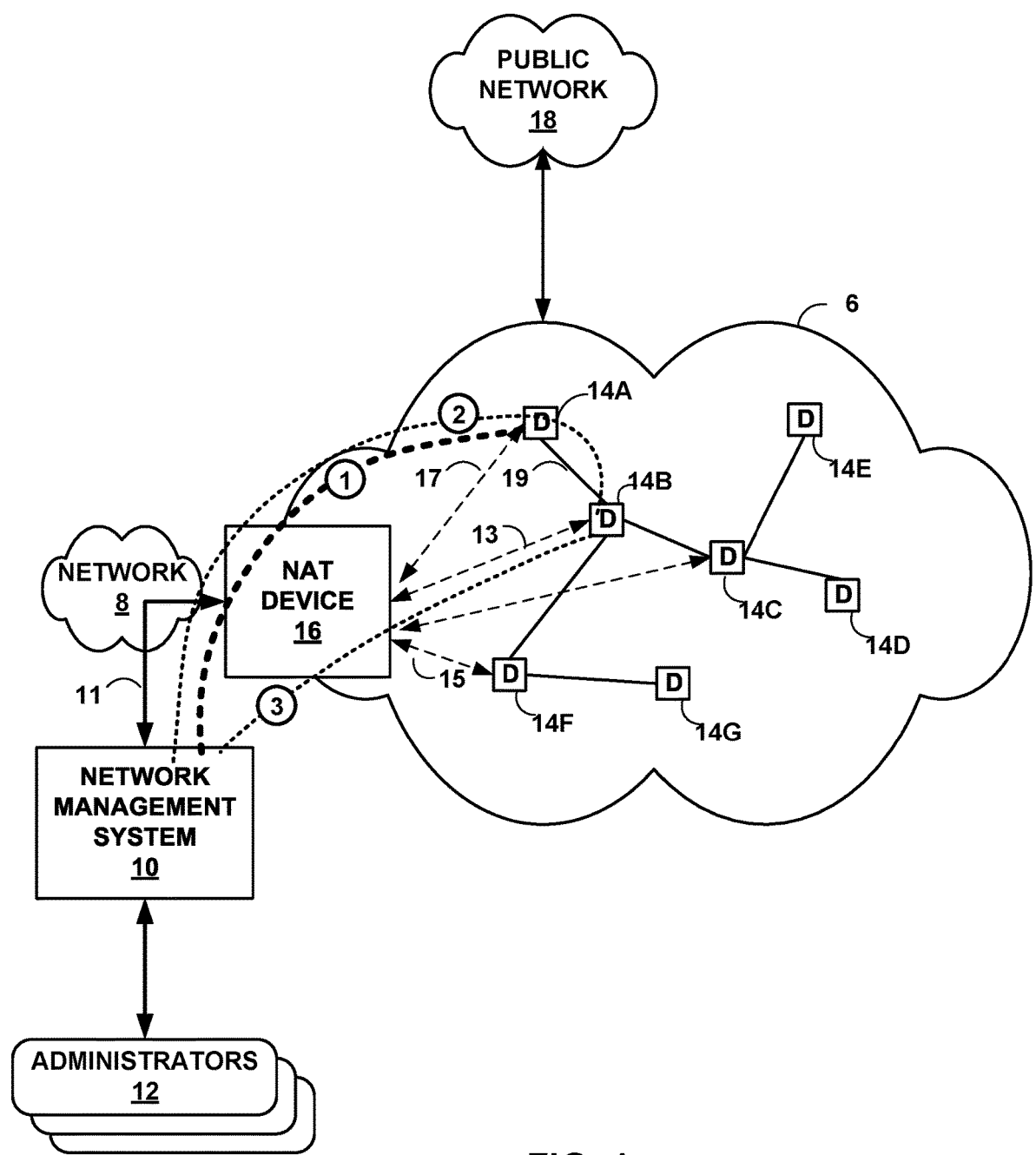
FIG. 1 is a block diagram illustrating an example including devices of an enterprise network that may be managed using a network management system according to the techniques of this disclosure.

FIG. 1 is a block diagram illustrating an example including devices of an enterprise network 6 that may be managed using a network management system 10. Managed devices 14A-14G (collectively, "network devices 14") of enterprise network 6 include network devices interconnected via communication links to form a communication topology in order to exchange resources and information. Network devices 14 may include, for example, routers, switches, gateways, bridges, hubs, servers, firewalls or other intrusion detection systems (IDS) or intrusion prevention systems, computing devices, computing terminals, printers, other network devices, or a combination of such devices. While described in this disclosure as transmitting, conveying, or otherwise supporting packets, enterprise network 6 may transmit data according to any other discrete data unit defined by any other protocol, such as a cell defined by the Asynchronous Transfer Mode (ATM) protocol, or a datagram defined by the User Datagram Protocol (UDP). Communication links interconnecting network devices 14, network management system 10 and NAT device 16 may be physical links (e.g., optical, copper, and the like), wireless, or any combination thereof.

Enterprise network 6 is shown coupled to public network 18 (e.g., the Internet) via a communication link. Public network 18 may include, for example, one or more administrator computing devices. Public network 18 may provide access to web servers, application servers, public databases, media servers, end-user devices, and other types of network resource devices and content.

Network management system 10 is communicatively coupled to network devices 14 via enterprise network 6 through NAT device 16. In some examples, NAT device 16 may be a firewall device. Network management system 10, in some examples, forms part of a device management system, although only one device of the device management system is illustrated for purpose of example in FIG. 1. In the example of FIG. 1, network management system 10 is not connected directly to any of the network devices 14.

Once network devices 14 are deployed and activated, administrators 12 may use network management system 10 (or multiple such network management systems) to manage the network devices using a device management protocol, provided the administrators 12 add the network devices 14 to network management system 10. As mentioned above, network management system 10 may not have access to the private IP addresses of network devices 14.

One example device protocol is the Simple Network Management Protocol (SNMP) that allows network management system 10 to traverse and modify management information bases (MIBs) that store configuration data within each of managed network devices 14. Further details of the SNMP protocol may be found in Harrington et al., RFC 3411, "An Architecture for Describing Simple Network Management Protocol (SNMP) Management Frameworks," Network Working Group, the Internet Engineering Task Force draft, December 2002, available at tools.ietf.org, the entire contents of which are incorporated herein by reference.

In common practice, network management system 10 and network devices 14 are centrally maintained by an IT group of the enterprise. Administrators 12 interact with network management system 10 to remotely monitor and configure network devices 14. For example, administrators 12 may receive alerts from network management system 10 regarding any of network devices 14, view configuration data of network devices 14, modify the configurations data of network devices 14, add new network devices to enterprise network 6, remove existing network devices from enterprise network 6, or otherwise manipulate the enterprise network 6 and network devices therein. Although described with respect to an enterprise network, the techniques of this disclosure are applicable to other network types, public and private, including LANs, VLANs, VPNs, and the like.

In some examples, administrators 12 use network management system 10 or a local workstation to interact with network devices 14, e.g., through telnet, secure shell (ssh), or other such communication sessions. That is, network devices 14 generally provide interfaces for interaction, such as command line interfaces (CLIs), web-based interfaces, graphical user interfaces (GUIs), or the like, by which a user may interact with the devices to issue text-based commands. For example, these interfaces typically allow a user to interact with the device, e.g., through a telnet, ssh, hypertext transfer protocol (HTTP), or other network session, to enter text in accordance with a defined syntax to submit commands to the managed device. In some examples, the user initiates an ssh session over link 15 with one of network devices 14, e.g., device 14F, using network management system 10, to configure device 14F. In this manner, a user may provide commands in a format for execution to network devices 14.

Further, administrators 12 may also create scripts that may be submitted by network management system 10 to any or all of network devices 14. For example, in addition to a CLI interface, network devices 14 also provide interfaces for receiving scripts that specify the commands in accordance with a scripting language. In a sense, the scripts may be output by network management system 10 to automatically invoke corresponding remote procedure calls (RPCs) on the managed network devices 14. The scripts may conform to, e.g., extensible markup language (XML) or another data description language.

Administrators 12 use network management system 10 to configure network devices 14 to specify certain operational characteristics that further the objectives of administrators 12. For example, administrators 12 may specify for a device, device 14C for example, a particular operational policy regarding security, device accessibility, traffic engineering, quality of service (QoS), network address translation (NAT), packet filtering, packet forwarding, rate limiting, or other policies. Network management system 10 uses one or more network management protocols designed for management of configuration data within managed network devices 14, such as the SNMP protocol or the Network Configuration Protocol (NETCONF) protocol or a derivative thereof to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org. Network management system 10 may establish NETCONF sessions with one or more of network devices 14.

In general, network management system 10 maintains working drafts of candidate configurations to be applied to network devices 14, prior to committing configuration changes to network devices 14, e.g., in a private data store. Network management system devices that support a private data store persist private copies of data in the private data store separately, until the private copy is committed to a database. Data change requests in one draft need to be checked for conflicts with other drafts and persist the changes. This occurs in the business layer and conflicts detection does not occur in real time. Examples of techniques for detection of conflicts across multiple proposed changes to configuration data is discussed in greater detail in Chandrasekhar et al., "PROCESSING MULTIPLE PARALLEL HIGH LEVEL CONFIGURATION CHANGES FOR MANAGED NETWORK DEVICES," U.S. Pat. No. 10,374, 886, issued on Aug. 6, 2019, the entire contents of which are hereby incorporated by reference.

In the example of FIG. 1, network devices 14A-14G are behind NAT device 16 with respect to network management system 10. In this example, network management system 10 may also manage other network devices (not shown) that are not behind a NAT device with respect to network management system 10. For example, network management system 10 may manage network devices in network 8. With a configuration like the example of FIG. 1, typically network devices 14A-G would have to be manually added on to network management system 10 as discussed above.

While network management system 10 may have access to the IP addresses of network devices not behind a NAT device (for example, devices in network 8), network management system 10 may not have access to the private IP addresses of network devices 14. As such, it may be desirable to enable network management system 10 to add and configure network devices 14 without administrators 12 having to manually add each network device 14 into network management system 10. For example, an administrator may model a single one of network devices 14 and commit an activation configuration on that device. Network management system 10 may then discover other network devices 14 through, for example, link layer data protocol (LLDP) information on the single network device. Network management system may also add the newly discovered network devices 14 and commit an activation configuration on the newly discovered network devices 14 as well.

According to techniques of this disclosure, network management system 10 may discover, add and configure network devices 14 behind NAT device 16. For example, an administrator 12 may model one of network devices 14A-14G on network management system 10 as a seed network device, network device 14A, for example. In other words, network management system 10 may receive the model of seed network device 14A from administrator 12. The model of seed network device 14A may contain information relating to how seed network device 14A may be configured, the capabilities of seed network device 14A, etc. In response to receiving the model of seed network device 14A, network management system 10 may generate a first activation configuration. The administrator 12 may manually commit, for example via links 11 and 17, the first activation configuration on seed network device 14A. Alternatively, network management system 10 may commit the first activation configuration on the seed network device, for example, through the use of a script. In response to the first activation configuration being committed on seed network device 14A, seed network device 14A may request a first connection to network management system 10, for example through an outbound secure shell (ssh) connection, over links 17 and 11 and a first connection may be established between network management system 10 and seed network device 14A. While not showing the path through links 17 and 11, the first connection is also represented by connection 1. In some examples network management system 10 may establish the first connection. In other examples, the seed network device 14A may establish the first connection. In some examples, the first connection between the network management system 10 and seed network device 14A may be an ssh connection.

Network management system 10 may then discover other network devices, e.g. network devices 14B-14G, leveraging the first connection between network management system 10 and seed network device 14A. In one example, network management system 10 my use link layer data protocol (LLDP) information on seed network device 14A to discover neighboring network devices, such as 14B-14G. LLDP is a link layer protocol used by network devices for advertising their identities, capabilities and neighbors. In some examples, network management system 10 recursively scans through LLDP information on newly discovered network devices to discover all of the discoverable network devices behind NAT device 16, leveraging connections between network management system 10 and other of network devices 14B-14G. To the extent that some of the network devices behind NAT device 16 are not discovered, an administrator 12 may provide their private IP addresses in enterprise network 6 to network management system 10, such as by providing a range of IP addresses or a subnet.

In some examples, network management system 10 may discover a plurality of network devices through the LLDP information on seed network device 14A. For ease of explanation, the example discussed herein focuses on a single network device, network device 14B. Network management system 10 may attempt to create a second connection to a neighboring network device (e.g., network device 14B) that neighbors seed network device 14A, for example by tunneling through the first connection to seed network device 14A. For example, network management system 10 may attempt to establish an ssh connection over links 11, 17 and 19. While not showing the path through links 11, 17 and 19, the second connection is also represented by connection 2. With the tunneled ssh connection, network device 14A would not be able to read the message traffic meant for network device 14B. If the second connection is successfully established, network management system 10 may automatically model that neighboring network device (e.g., network device 14B) on to network management system 10, generate a second activation configuration and commit the second activation configuration on neighboring network device 14B. Neighboring network device 14B may request a third connection with network management system 10, for example, an outbound ssh connection through links 13 and 11. This third connection would not be through seed network device 14A. In other words, the third connection would be a non-tunneled connection with respect to seed network device 14A as it would not pass through seed network device 14A. While not showing the path through links 13 and 11, the third connection is also represented by connection 3. The third connection may be established between network management system 10 and neighboring network device 14B. In some examples network management system 10 may establish the third connection. In other examples, the neighboring network device 14B may establish the third connection. Network management system 10 may then discover other network devices behind NAT device 16 through LLDP information on neighboring network device 14B, leveraging the third connection between network management system 10 and neighboring network device 14B. Network management system 10 may continue similarly with network devices of enterprise network 6 (e.g., network devices 14C-14G) until network management system 10 discovers all discoverable network devices in enterprise network 6. In some examples, network management system 10 may continue similarly with network devices of enterprise network 6 (e.g., network devices 14C-14G) until network management system 10 both discovers and configures all discoverable network devices of enterprise network 6.

In some examples, network management system 10 may discover a plurality of neighboring network devices through seed network device 14A. Network management system 10 may initiate tunneled second connections to the plurality of neighboring network devices through seed network device 14A. Network management system 10 may automatically model the plurality of neighboring network devices and may automatically commit a unique activation configuration on each of the neighboring network devices. In other words, each neighboring network device would have an activation configuration that is different from each of the other neighboring network devices.

In this manner, the techniques of this disclosure enable bulk discovery of devices behind a NAT device, such as NAT device 16, without requiring time consuming and tedious manual configuration of each device behind the NAT device. As mentioned above, network management system 10 may not have access to the private IP addresses of network devices behind a NAT device and therefore may not be able to sweep through an IP address list to discover network devices behind a NAT device. These techniques of this disclosure may enable network operators to save costs as well as fewer administrator resources may be needed.

Figure 2:
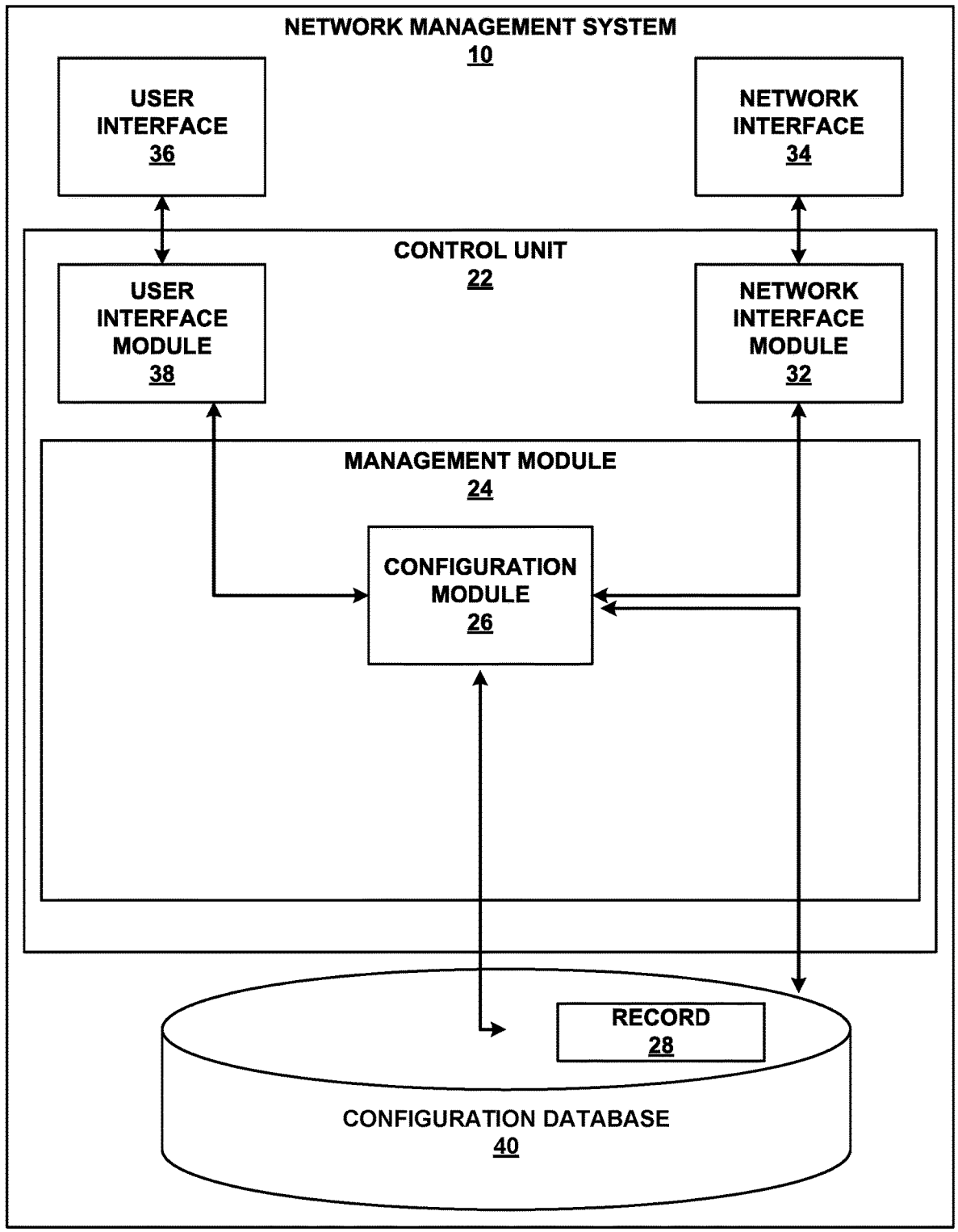
FIG. 2 is a block diagram illustrating an example set of components for the network management system of FIG. 1.

FIG. 2 is a block diagram illustrating an example set of components for network management systems 10 and 10 of FIG. 1. In this example, network management system 10 includes control unit 22, network interface 34, and user interface 36. Network interface 34 represents an example interface that may communicatively couple a network device (not shown) to an external device, e.g., one of network devices 14A-14G of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Network management system 10 may include multiple network interfaces in various examples, although only one network interface is illustrated for purposes of example.

Control unit 22 represents any combination of hardware, software, and/or firmware for implementing the functionality attributed to control unit 22 and its constituent modules and devices. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1) interacts with network management system 10, e.g., to provide input and receive output. For example, user interface 36 may represent one or more of a monitor, keyboard, mouse, touchscreen, touchpad, trackpad, speakers, camera, microphone, or the like. Furthermore, although in this example network management system 10 includes a user interface, administrators 12 need not directly interact with network management system 10, but instead may access network management system 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Functionality of control unit 22 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 executes management module 24 to manage various network devices, e.g., network devices 14A-14G of FIG. 1. Management includes, for example, configuring the network devices according to instructions received from a user (e.g., administrators 12 of FIG. 1) and providing the user with the ability to submit instructions via user interface 36 to configure the network devices. In some examples, management module 24 is a software process such as a management daemon or management application. In this example, management module 24 further includes configuration module 26.

Management module 24 is configured to receive configuration instructions for a set of managed network devices from a user via user interface 36, such as administrators 12. One example is the first activation configuration described above with respect to network management system 10. Over time, the user may update the configuration instructions, e.g., to add new services, remove existing services, or modify existing services performed by the managed devices.

Network management system 10 also includes configuration database 40. Configuration database 40 generally includes information describing managed network devices, e.g., network devices 14. For example, configuration database 40 may include information indicating device identifiers (such as MAC and/or IP addresses), device type, device vendor, devices species (e.g., router, switch, bridge, hub, etc.), or the like. Configuration database 40 also stores current configuration information for the managed devices (e.g., network devices 14).

Although user interface 36 is described as allowing administrators 12 (FIG. 1) to interact with network management system 10, other interfaces may be used in other examples. For example, network management system 10 may include a representational state transfer (REST) administrator (not shown) that may act as an interface to another device, by which administrators 12 may configure network management system 10. Likewise, administrators 12 may configure network devices 14 by interacting with network management system 10 through the REST administrator.

Figure 3:
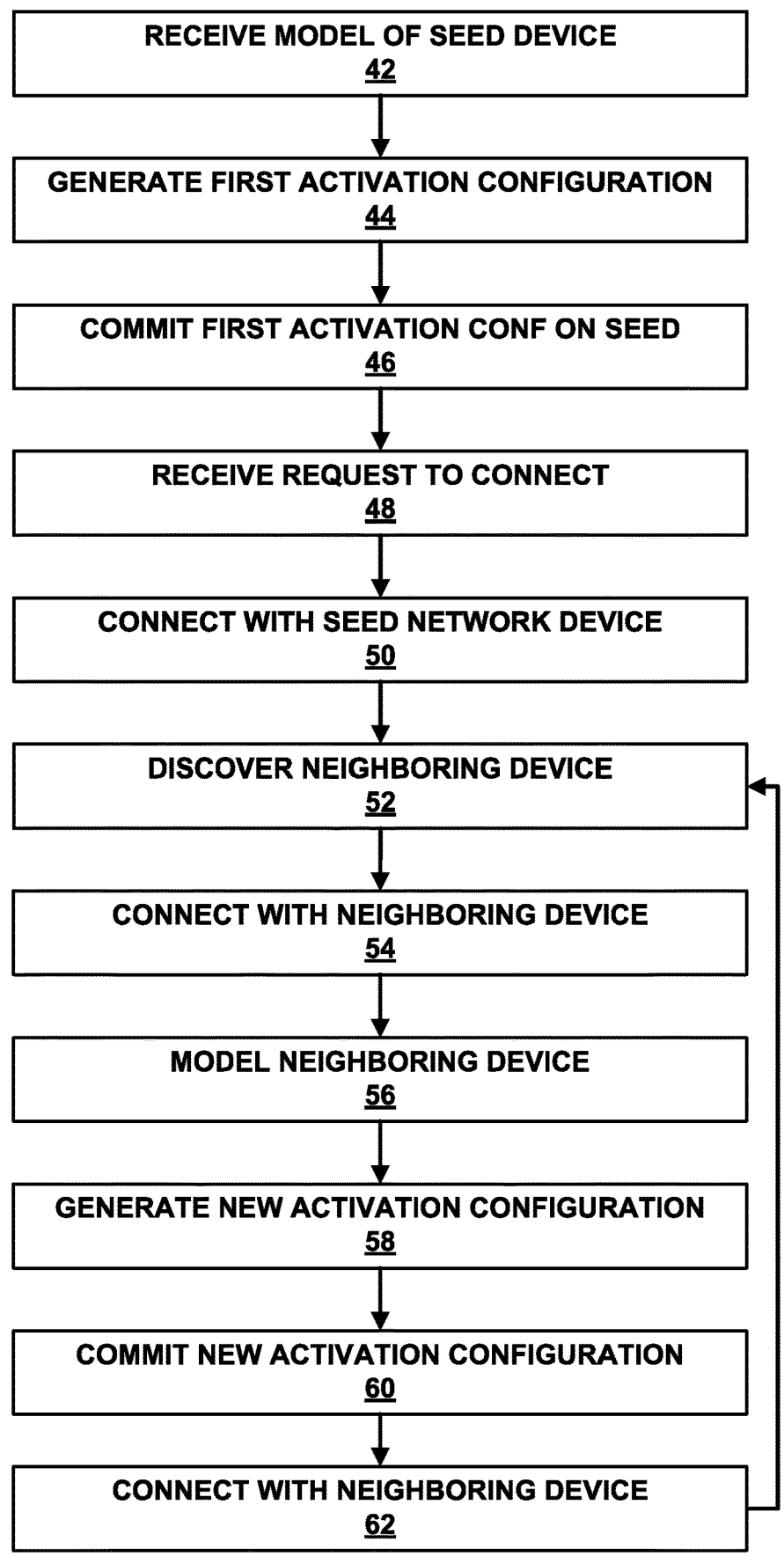
FIG. 3 is a flow diagram illustrating further techniques of this disclosure.

FIG. 3 is a flow diagram illustrating further techniques of this disclosure. Network management system 10 may receive a model of a seed network device, e.g. seed network device 14A (42). Network management system 10 may receive the model of seed network device 14A from an administrator 12 through user interface 36, for example. Network management system 10 may generate a first activation configuration based upon the received model of seed network device 14A (44). Network management system 10 may commit the first activation configuration on seed network device 14A (46). For example, network management system 10 may connect with seed network device 14A through network interface 34, link 11 and link 17 and push the first activation configuration on seed network device 14A.

Network management system 10 may receive a request for a first connection from seed network device 14A (48). The request for a first connection may be through an outbound-ssh connection through link 17 and link 11. A first connection may be established between network management system 10 and seed network device 14A (50) through network interface 34, link 11 and link 17. In some examples, the first connection may be established by network management device 10. In other examples, the first connection may be established by seed network device 14A using outbound-ssh.

During the first connection, network management device 10 may access LLDP information stored in memory of seed network device 14A. In this manner, network management device 10 may discover neighboring devices that neighbor seed network device 14A (52). In some examples network management device 10 may discover a plurality of neighboring network devices. For ease of explanation, the example herein focuses on network device 14B. For example, network management device 10 may discover that the LLDP information in memory of seed network device 14A identifies neighboring network device 14B, for example by a private IP address.

Network management system 10 may then connect with neighboring network device 14B by a second connection based on the identifying information from the LLDP information in memory of seed network device 14A (54) through network interface 34, link 11, link 17 and link 19. In some examples, the second connection may be an ssh connection tunneled through the first connection (via link 11 and link 17) with seed network device 14A. Network management system 10 may automatically model neighboring network device 14B (56), for example, using a script. Network management system 10 may generate a new activation configuration, in this case a second activation configuration (58). This second activation configuration may be unique to neighboring network device 14B. Network management system 10 may then commit the second activation configuration on neighboring network device 14B via the tunneled ssh connection through network interface 34, link 11, link 17 and link 19 (60).

A third connection may be established between network management system 10 and neighboring network device 14B (62). The third connection may not be a connection through seed network device 14A. In other words, the third connection may be a non-tunneled connection with respect to seed network device 14A. For example, the third connection may be through link 11 and link 13 and may be an ssh connection. The third connection is for management of neighboring network device 14B by network management system 10. In some examples, network management system 10 establishes the third connection. In other examples, neighboring network device 14B establishes the third connection using outbound-ssh. Network management device 10 then may discover additional network devices in enterprise network 6 from LLDP information stored in memory of neighboring network device 14B (52). Network management system 10 may continue this process between blocks (52) and (62) until all discoverable network devices 14A-14G are discovered. In some examples, network management system 10 may continue this process between blocks (52) and (62) until all discoverable network devices 14A-14G are discovered and configured.

In this manner, network management system 10 may discover all discoverable network devices behind NAT device 16 using only a single manually modeled seed network device. Network management system 10 may use tunneled ssh connections to connect with other network devices and committing automatically created activation configurations on those network devices. Those other devices may then request non-tunneled connections with network management system 10 as described above.

While FIG. 3 shows steps occurring in series, the steps may be carried out in parallel. For example, if network management system 10 discovers information on a plurality of neighboring network devices on seed network device 14A, network management system 10 may initiate tunneled second connections to the plurality of neighboring network devices through seed network device 14A. Network management system 10 may automatically model the plurality of neighboring network devices and may automatically commit a unique activation configuration on each of the neighboring network devices. In other words, each neighboring network device would have an activation configuration that is different from each of the other neighboring network devices.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A system comprising:
   memory; and
   one or more processors coupled to the memory, the one or more processors being configured to:
   connect from the system to a seed network device through a first connection, the seed network device being behind a network address translation device or a firewall relative to the system;
   discover, through the first connection, a plurality of neighboring network devices that neighbor the seed network device, the plurality of neighboring network devices being behind the network address translation device or the firewall relative to the system;
   initiate tunneled second connections from the system to the plurality of neighboring network devices through the seed network device;
   commit, through the tunneled second connections, an activation configuration on each of the plurality of neighboring network devices, each activation configuration being unique to one of the plurality of neighboring network devices; and
   in response to the committing of each activation configuration, establish a non-tunneled secure shell (ssh) connection from the system to each of the plurality of neighboring network devices.

2. The system of claim 1, wherein the one or more processors are configured to discover the plurality of neighboring network devices by using Link Layer Discovery Protocol (LLDP) information on the seed network device.

3. The system of claim 1, wherein the one or more processors are configured to discover the plurality of neighboring network devices by receiving a private IP address for at least one of the plurality of neighboring network devices.

4. The system of claim 1, wherein the first connection comprises an ssh connection.

5. The system of claim 1, wherein the second connections comprise ssh connections.

6. The system of claim 1, wherein the one or more processors are further configured to commit a first activation configuration on the seed network device through the first connection.

7. The system of claim 1, wherein the one or more processors are further configured automatically model the plurality of neighboring network devices.

8. The system of claim 1, wherein the one or more processors are further configured to automatically generate each activation configuration for the plurality of neighboring network devices.

9. A method comprising:
   connecting through a first connection, from a network management system, to a seed network device, the seed network device being behind a network address translation device or a firewall relative to the system;
   discovering through the first connection, by the network management system, a plurality of neighboring network devices that neighbor the seed network device, the plurality of neighboring network devices being behind the network address translation device or the firewall relative to the system;
   initiating, by the network management system, second tunneled connections from the network management system to the plurality of neighboring network devices through the seed network device;
   committing through the second connections, by the network management system, an activation configuration on each of the plurality of neighboring network devices, each activation configuration being unique to one of the plurality of neighboring devices;
   establishing, by the network management system and in response to the committing of each activation configuration, a non-tunneled secure shell (ssh) connection from the network management system to each of the plurality of neighboring network devices.

10. The method of claim 9, wherein the discovering the plurality of neighboring network devices comprises using Link Layer Discovery Protocol (LLDP) information on the seed network device.

11. The method of claim 9, wherein the discovering the plurality of neighboring network devices comprises receiving a private IP address for at least one of the plurality of neighboring network device.

12. The method of claim 9, wherein the first connection comprises an ssh connection.

13. The method of claim 9, wherein the second connections comprise ssh connections.

14. The method of claim 9, further comprising committing, by the network management system, a first activation configuration on the seed network device through the first connection.

15. The method of claim 9, further comprising automatically modeling, by the network management system, the plurality of neighboring network devices.

16. The method of claim 9, further comprising automatically generating, by the network management system, each activation configuration for the plurality of neighboring network devices.

17. A non-transitory computer readable medium comprising instructions that when executed by one or more processors cause the one or more processors to:
- connect from a network management system to a seed network device through a first connection, the seed network device being behind a network address translation device or a firewall relative to the system;
- discover through the first connection a plurality of neighboring network devices that neighbor the seed network device, the plurality of neighboring network devices being behind the network address translation device or the firewall relative to the system;
- initiate tunneled second connections from the network management system to the plurality of neighboring network devices through the seed network device;
- commit through the tunneled second connections an activation configuration on each of the plurality of neighboring network devices, each activation configuration being unique to one of the plurality of neighboring network devices; and
- in response to the committing of each activation configuration, establish a non-tunneled secure shell (ssh) connection from the network management system to each of the plurality of neighboring network devices.

18. The non-transitory computer readable medium of claim 17, wherein the instructions cause the one or more processors to discover the plurality of neighboring network devices by using Link Layer Discovery Protocol (LLDP) information on the seed network device.

\* \* \* \* \*